United States Patent

Augart

(10) Patent No.: US 6,826,172 B1
(45) Date of Patent: Nov. 30, 2004

(54) NETWORK PROBING USING OVERLAPPING PROBE PACKETS

(76) Inventor: Steven Augart, 944 Harding Ave., Venice, CA (US) 90291

(*) Notice: Subject to any disclaimer, the term of this patent is extended or adjusted under 35 U.S.C. 154(b) by 741 days.

(21) Appl. No.: 09/591,526

(22) Filed: Jun. 9, 2000

(51) Int. Cl.$^7$ .............................................. H04L 12/28
(52) U.S. Cl. ...................................... 370/351; 370/389
(58) Field of Search ................................ 370/351, 386, 370/389, 392, 393, 394, 395.2, 395.31, 395.32, 400, 401

(56) References Cited

U.S. PATENT DOCUMENTS

| | | | |
|---|---|---|---|
| 5,675,741 A | 10/1997 | Aggarwal et al. | 395/200.12 |
| 5,884,038 A | 3/1999 | Kapoor | 395/200.56 |
| 5,892,753 A | 4/1999 | Badt et al. | 370/233 |
| 5,948,061 A | 9/1999 | Merriman et al. | 709/219 |

OTHER PUBLICATIONS

"An Internet Gazetteer", WARP Report W7–95, published by Division of Computer Science, University of St. Andrews, 1995.
Jack Rickard, "Mapping the Internet with Trace route", Broadwatch, Dec. 1996.
Arup Acharya et al., "A WWW–Based Location Dependent Information Service for Mobile Clients", Jul. 17, 1995.
David Moore et al., "Where in the World is netgeo.caid-a.org?", printed from web page at www.caida.org/outreach/papersinet_netgeo/, Jul. 24, 2000.
C. Davis et al., "A Means for Expressing Location Information in the Domain Name System," Network Working Group, Jan. 1996.
C. Farrell, et al., "DNS Encoding of Geographical Location", Network Working Group, Nov. 1994.
J. Gargano et al., "Whois and Network Information Lookup Service Whois++", Network Working Group, Aug. 1995.
Tomasz Imielinski et al., "GPS–Based Addressing and Routing", published by Computer Science Department, University of Rutgers, Mar. 7, 1996.
Tomasz Imielinski et al., "Geographic Addressing, Routing, and Resource Discovery with the Global Positioning System", published by Computer Science Department, University of Rutgers, Oct. 19, 1996.
T. Imielinski et al., "GPS–Based Addressing and Routing", Network Working Group, Nov. 1996.
Julio Navas et al., "GeoCast—Geographic Addressing and Routing", published by Computer Science Department, Rutgers University.
Scott Pleitner et al., "Geotraceman: A Visual Traceroute", published by Department of Computer Science, Curtin University of Technology, Jun. 19, 1995.
Mke Schulze et al., "Network Monitoring and Visualisation Tools", published by Department of Computer Science, Curtin University, Nov. 21, 1993.

*Primary Examiner*—Wellington Chin
*Assistant Examiner*—Brenda Pham
(74) *Attorney, Agent, or Firm*—Mitchell Silberberg & Knupp LLP

(57) ABSTRACT

Provided are apparatuses and techniques for use by a first node on a network in determining the geographic location of a second node on the network. A data packet is received over the network from the second node, the data packet including a network identifier for the second node. Then, multiple probe packets addressed to the network identifier for the second node are sent, each of the probe packets being sent without waiting for a response from any previous probe packet.

20 Claims, 3 Drawing Sheets

NETWORK PROBING USING OVERLAPPING PROBE PACKETS

BACKGROUND OF THE INVENTION

1. Field of the Invention

The present invention concerns techniques and apparatuses for probing nodes on a network, such as the Internet, and is particularly related to probing techniques utilizing overlapping probe packets.

2. Description of the Related Art

The Internet is a decentralized global network of millions computers. Each computer connected to the Internet is independent and may be capable of operating as a host computer (host) that primarily provides data over the Internet or a client computer (client) that primarily receives data over the Internet. A host computer may receive a data request from any other computer on the Internet and respond to the request by transmitting any of various types of data, such as hypertext markup language (HTML) code, back to the client. A client computer may send data requests to various hosts on the Internet and then download data in response. Typically, host computers are used by information providers for various commercial, educational, or governmental purposes and are dedicated host computers (servers or Web servers).

Ordinarily, the client computers are used by individuals to connect to the Internet via an Internet Service Provider (ISP) or, more generically, a network service provider (NSP). ISPs are companies that provide access to the Internet, typically for a fee. For example, a client computer may establish a dial-in connection to an ISP over an ordinary telephone line. ISPs are also called IAPs (Internet Access Providers).

Each host and client on the Internet is identified by a unique Internet Protocol (IP) address which is a series of numbers, such as 24.130.64.154. Because the IP address, in its numeric form, is difficult to memorize and use, a domain name may be assigned to a host and, therefore, associated with the numeric IP address. For example, a server having an address of 24.130.64.154 may be associated with domain name server.npeponis.com. It is noted that multiple IP addresses may be associated with the same domain name and, similarly, many domain names may be associated with the same IP address or addresses. A domain name server (DNS) performs the task of converting the domain names to IP addresses. Most frequently, separate domain names are not permanently assigned to individual clients but, rather, blocks of IP addresses are assigned to the ISPs that serve those clients.

FIG. 1 illustrates a client 101 communicating with a server 103. In the instant example, the client 101 first connects to its local ISP 105 (e.g., using a modem via a dial-in connection). For purposes of the current connection only, ISP 105 assigns one of its IP addresses to client 101. Upon completion of this connection, client 101 may begin communicating over the Internet. For example, the client 101 may send a request for file main.html to the server 103 having the domain name server.npeponis.com. Such a request might be initiated, for example, by the user typing http://server.npeponis.com/main.html in the address field of a web browser running on client computer 101 and then pressing the "Enter" key. Alternatively, such a request might be initiated by the user simply clicking on a graphic, image or text item that serves as a hyperlink to that address. In response, the browser sends out one or more data packets (or datagrams) addressed to IP address 24.130.64.154 (possibly, after having obtained that IP address from a DNS), with such data packets including a request to retrieve file main.html.

Communication between two entities on the Internet is conducted in accordance with certain protocols. The most commonly used protocols are the Internet Protocol (IP), which is a connectionless-mode communications protocol, and Transmission Control Protocol (TCP), which is a connection-oriented protocol. In accordance with TCP/IP, messages are divided into smaller packets. Each such packet includes, in addition to the destination address and data corresponding to at least a portion of the message, an IP address identifying the source of the packet and various other fields necessary for communication in accordance with TCP/IP and other established protocols. Some of these other protocols and fields are described below. As noted above, the IP address for a client computer connecting through an ISP typically is dynamically assigned by the ISP each time the client computer connects to the ISP and then reassigned after the client using it logs off.

Upon receipt of request 102, the server 103 typically first initiates handshaking communications to establish a TCP connection and then responds to the request by sending to the client one or more data packets that together contain the contents of the file main.html. In this manner, communications can occur between two nodes on the Internet, with TCP/IP specifying the protocols for separating each message into data packets, routing the packets between the two nodes, reassembling the packets at the destination, and verifying that each message was properly received.

Another commonly used protocol is the HyperText Transfer Protocol (HTTP) format. The HTTP format is the underlying protocol used by the World Wide Web on the Internet and defines how messages are formatted and transmitted, as well as what actions Web servers and browsers take in response to various commands.

On the Internet, most data packets, including requests and responses, need to go through several routers before they reach their final destination. Each forwarding of a packet to the next router is termed a "hop". A router (or gateway) is a device that connects one network to another. Each router includes a dynamically updated routing table that is used by the router to identify the next router to which any given packet should be forwarded. Specifically, the receiving router attempts to identify the router that is most likely to be closest (geographically and/or in terms of number of hops) to the packet's ultimate destination.

In the example of FIG. 1, client 101 sends a request 102 to server 103. The request is delivered to the server 103 via routers 105, 107, 109, 111, 113, and 115. As indicated by the ellipsis 117, the request may go through other routers as well. In other words, the request may make many hops before reaching the intended server 103. As noted above, the precise path taken by request 102 will be determined by the individual routers along the way. In the event that a receiving router determines that it is unable to forward a packet closer to its final destination, it will send a message to that effect back to the router from which it received the packet. Then, that router will attempt to route the packet through a different router, adjust its routing table accordingly, and send a message to the router from which it received the packet. Such a situation might be temporary (e.g., in the case where a router is temporarily inoperable) or permanent (e.g., where a router has been permanently taken off line). Other communications, such as periodically broadcasting a router's entire routing table, also occur among the routers on the Internet, permitting them to coordinate their routing activities. Propagation of changes in the network topology through the various routers in the network can permit communications to occur fairly reliably, even in the presence of constantly changing network conditions. Among the tools commonly used are the Routing Information Protocol (RIP) and the Internet Control Message Protocol (ICMP).

Irrespective of the route through which the request 102 is made or the number of hops taken by the request 102, the preferred end result is the receipt of the request 102 by the host 103 and the response by server 103 sending the requested data file via the Internet. Like the request, the data file is divided among appropriately sized (e.g., using conventional algorithms to identify an appropriate size) data packets and may travel through several routers to arrive at the client 101. Generally, the route taken by the response 104 will be the same as that taken by the request 102. However, it is possible that the routing may be asymmetric, such as where a client computer transmits packets to an ISP over a conventional telephone line/modem connection but receives packets via a satellite dish, e.g., via the Direct PC network. Asymmetric routing may also occur in certain other cases, such as where a router in the link used for transmitting the request goes down before the response to the request can be transmitted; therefore, the response needs to be re-routed. In addition to asymmetric routing, it is also possible that packets traveling in a single direction (e.g., all request packets) may take different paths (multi-path routing). This may occur, for example, in the event that a router goes down while the request is being made; in addition, one or more routers in the link may be intentionally configured to route packets that are addressed to the same destination to different routers in an attempt to balance the communication load over the Internet. However, at present, both asymmetric routing and multi-path routing are considered to be unusual routing conditions.

The response to the request may contain any of a wide variety of information. However, in many instances, it would be preferable for the response to contain information that is tailored to the specific geographic region of the client 101. For example, it may be preferable for the file 104 sent as the response to the request 102 to include weather information for the geographic region in which the client 101 is located. In another example, it may be preferable for the file 104 sent as the response to the request 102 to include banner or other advertising for businesses located within driving distance of the location of the client 101. In conventional systems, the response file 104 typically may contain these types of information only when the user of the client computer 101 has already supplied information regarding his or her location to the server 103, at least once. Unfortunately, many users may not want to expend the effort necessary to type in address or even zip code information that identifies their geographic locations. Moreover, even those that are willing to do so typically will find it very inconvenient, particularly when such information may have to be supplied for each different Web site that the user visits.

The prior art has included some discussion regarding automatically gathering information concerning the geographic location of Internet clients. However, all of these techniques have certain shortcomings, most notably, relatively long delays and limited access to geographical information pertaining to nodes on the Internet.

For example, U.S. Pat. No. 5,948,061 (the "061 Patent") to Merriman et al. titled "Method of Delivery, Targeting, and Measuring Advertising Over Networks" (which is incorporated herein by reference as though set forth herein in full) notes that a traceroute operation can be used in obtaining geographic information for a user. In this regard, conventional traceroute operations were originally designed to troubleshoot Internet routing problems (such as routing loops) and generally function by sending out a number of probe packets, all addressed to the same target node, to identify all of the routers that forward packets between the current node and the target node. All of the probe packets are IP packets, each having a Time-To-Live (TTL) field which indicates the maximum number of hops that the IP packet can make before an ICMP Time Exceeded packet is returned.

The following description summarizes the operation of conventional traceroute operations in more detail. In operation, each router decrements the TTL field by 1 and then forwards the packet on (if the TTL value is greater than 0) or sends an ICMP Time Exceeded packet (if the TTL value is 0). Thus, if a probe packet is sent with a TTL value of 1, the first router to receive the packet decrements the TTL field to 0 and sends back a Time Exceeded packet. Because the Time Exceeded packet includes the source's address, the current node can identify the IP address of the closest router to it. If this node is not the target node, then the current node will send a probe packet with a TTL value of 2. Upon receipt, the first router decrements the TTL field to 1 and forwards the packet to the next router. The second router then decrements the TTL field to 0 and sends a Time Exceeded packet to the current node. Thus, the current node can identify the IP address of the second router. This conventional traceroute process continues until the target node responds to a probe packet, at which point the entire route will have been traced.

Although the foregoing description indicates that only a single probe packet is sent at each TTL value, conventional traceroute operations often send a fixed number of packets (e.g., 3) at each TTL value to cope with the problem of lost packets. Alternatively, a traceroute may wait a certain period of time for a response and, if no response is received within that time period, assume that the packet (or the response) is lost and send another probe packet with the same TTL value.

Conventional traceroute operations can take as long as 12 seconds on average to trace an entire routing path. This additional delay can be significant, particularly when considered in connection with all of the other delays at the server and in routing messages via the Internet. Because Internet users often are impatient with slow responding Web sites, such additional delays might result in loss of visitors to a Web site.

In addition, conventional suggested techniques for geographic positioning, such as the '061 Patent, often rely on telephone directories and other available sources to obtain geographic locations for nodes on the Internet. Such sources may be incomplete and/or not as up-to-date as possible.

SUMMARY OF THE INVENTION

The present invention addresses the foregoing problems by providing systems and techniques for probing a network using overlapping probe packets.

Thus, the invention is for use by a first node on a network in determining the geographic location of a second node on the network. A data packet is received over the network from the second node, the data packet including a network identifier for the second node. Then, multiple probe packets addressed to the network identifier for the second node are sent, each of the probe packets being sent without waiting for a response from any previous probe packet.

By sending out probe packets without waiting for responses from previous probe packets, the present invention often can probe a route or a portion of a route on a network, such as the Internet, much faster than conventional techniques would permit. As a result, in more particularized aspects of the invention, a geographic location can be obtained for a requestor quickly enough to provide geographically tailored information to the requestor in the initial response to the request.

The foregoing summary is intended merely to provide a quick understanding of the general nature of the present invention. A more complete understanding of the invention can only be obtained by reference to the following detailed description of the preferred embodiments in connection with the accompanying drawings.

DESCRIPTION OF THE PREFERRED EMBODIMENT(S)

Figure 1:
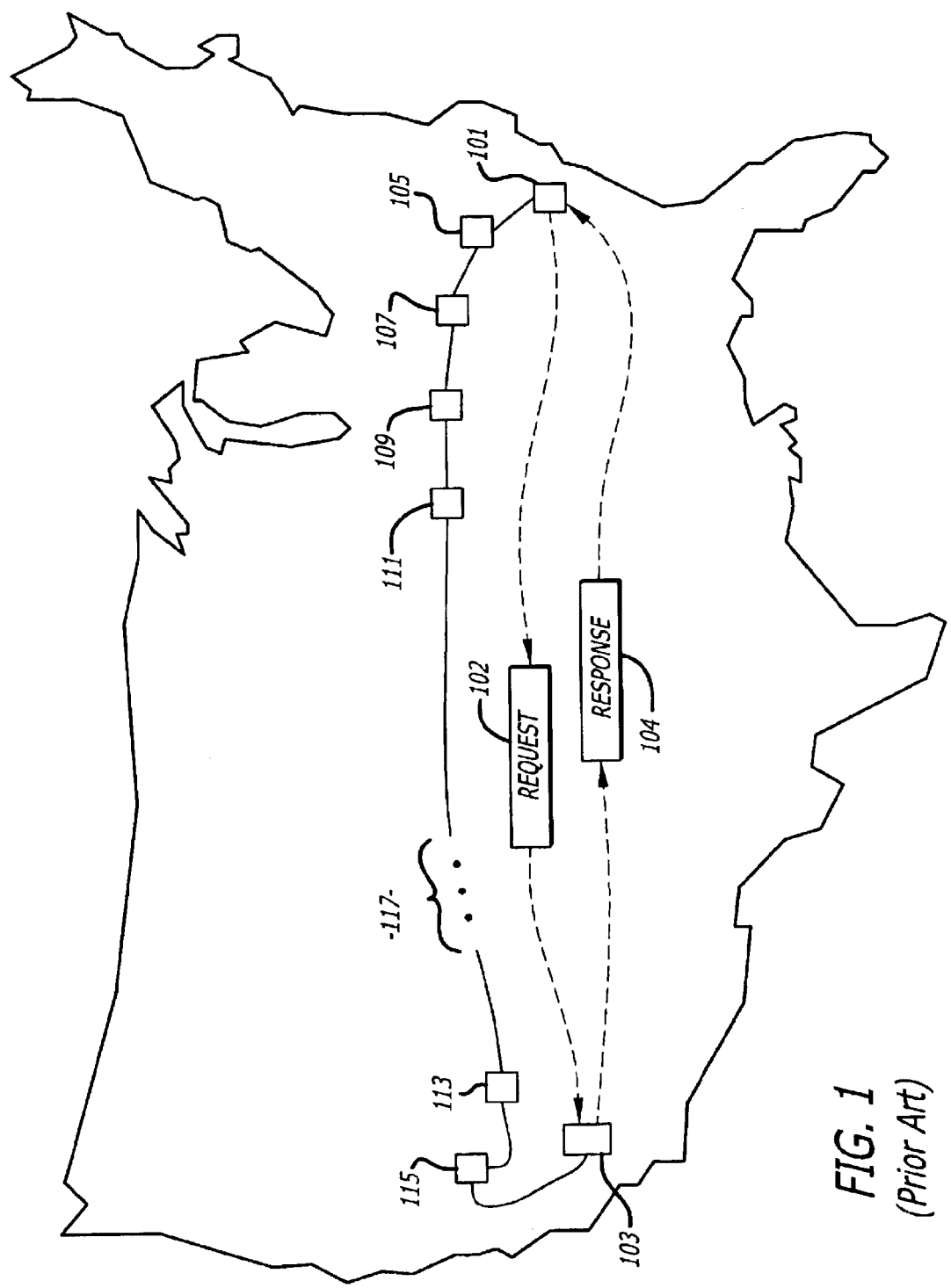
FIG. 1 is a diagram illustrating a communication route between a client and a host server via the Internet.

The following discussion describes the preferred embodiments of the invention. Wherever possible, the same reference numbers are used throughout the drawings to refer to the same or like parts. The patent applications for "Creating a Geographic Database for Network Devices" and "Determining the Geographic Location of a Network Device" filed by Steven Augart concurrently herewith are hereby incorporated by reference as though set forth herein in full.
Geographic Positioning.

An overview of geographic positioning according to a representative embodiment of the invention will be described with reference to the flow diagram illustrated in FIG. 2. Briefly, according to FIG. 2, a request packet is received; if a geographic location has already been determined for the requestor, that geographic location is used as the location of the requestor; otherwise, the number of hops taken by the request packet is estimated, probe packets are constructed and sent, and responses to the probe packets are received; a check is made for asymmetric routing; the source addresses of received packets are matched to a database to identify the geographic locations of the routers along the path; and the geographic location of the requesting node is identified based on that information.

In more detail, in step 142 a host computer receives a request over a network, such as the Internet, requesting data from the host. The request might be requesting display of a Web page, such as the home page of a particular Web site hosted by the host. However, the first packet of the request typically will be a SYN packet in conformance with the TCP/IP protocols and therefore will implicitly request initiation of a TCP connection between the requesting node and the hosting node.

Immediately upon receipt of such a request (preferably, immediately upon receipt of the SYN packet), the host initiates two parallel paths 143 and 160. In path 143, a geographic location is identified for the requesting node. In path 160, communications continue 162 with the requesting node, typically by first establishing and then utilizing a TCP/IP connection. Ultimately, the geographic location positioning information is supplied from path 143 to step 162 so as to permit step 162 to generate and transmit to the requestor geographic-specific information (e.g., local advertising, weather or news). It should be noted that although in the preferred embodiment of the invention, paths 143 and 160 occur simultaneously, it is also possible to defer initiation of path 160 (or at least the first communication of substantive response information in path 160) until the geographic information has been supplied by path 143, so as to permit the very first communication from the host to the requestor to include geographic-specific information.

In step 144, it is determined whether the requestor is already known. In this regard, the request packet preferably includes a source address in accordance with the TCP/IP protocols. By comparing this source address to a database of previously located addresses (e.g., IP addresses), the host can determine whether a geographic position already exists for the current source address (and, in certain embodiments, whether or not that location information has been recently enough updated or is otherwise sufficiently reliable to be presumed valid). If it is determined in step 144 that the requestor is known (and, in certain embodiments, known with adequate accuracy and/or precision), then in step 146 the geographic location of the requester is retrieved from the database and supplied to the TCP/IP communication process step 162 for use in downloading geographic-specific information to the requestor. However, if it is instead determined in step 144 that the requestor is unknown (or insufficiently known), then processing proceeds to step 148.

It is noted that the processing performed in step 144 may be as simple as referring to a database to determine whether a geographic position has already been identified. Alternatively, more complicated processing may instead be performed. As explained in more detail below, it is possible that the database may contain multiple geographic positions for the present requestor. If this is the case, a default one of those geographic locations may be selected, one of the geographic locations may be selected based upon predetermined criteria, or the host may attempt to identify the current geographic location, such as by performing the probing technique described below (i.e., commencing with step 148).

Still further, step 144 might identify a geographic home address for the present requestor in the database, but the database might also indicate that the requester frequently travels. In this case, step 144 might both initiate step 146 to supply the geographic home address of the requestor to TCP/IP communications process 160 and also initiate step 148 to begin the probe packet technique for identifying the current geographic location of the requestor. Communications process 160 may then use either or both of the home address and the current address in its communications with the requester. Finally, step 144 might be omitted entirely and a probing technique (such as the probe packet technique described below) used for each new request.

In step 148, the host computer evaluates the TTL field of the request to estimate how many hops the request has taken to arrive at the host. Preferably, this is accomplished by subtracting the TTL value of the received packet from an assumed initial TTL value for the packet. The TTL field has a maximum value of 255, and most applications set the TTL field to this maximum value so that a packet will make 255 hops before a Time Exceeded packet is returned. Thus, in many cases it can be safely assumed that the number of hops made by the received request packet is equal to 255 minus the value of the TTL field of the received request. On the other hand, it is becoming more common to deviate from the practice of setting the initial TTL value to the maximum of 255. Thus, for example, the current recommendation is to set the value to 60 for outgoing TCP/IP packets. In addition, certain historical implementations have used initial TTL values of 15 or 30. In order to cope with this variation, the preferred embodiment of the invention utilizes the following technique. If a packet arrives at its destination with a TTL value greater than 195, then it is assumed that the packet's initial TTL was 255. If a packet arrives at its destination with a TTL value of 60 or less, then it is assumed that the initial TTL value was 60. In any other case, or if application of the probing technique with this heuristically determined initial TTL value fails to yield a result, then the system preferably reverts to an alternate method, such as a brute-force method similar to that of conventional traceroute.

In most cases, the above-described heuristic rule will provide the most efficient results, and generally only in relatively rare situations will this technique have to revert to the less efficient method, with the overall result being a net increase in efficiency. It is also noted that the thresholds used above (i.e., 195 and 60) were selected based on an assumption that the diameter of the Internet is less than 60 hops and based on the design of conventionally deployed TCP implementations. Accordingly, those thresholds can be changed based on the user's expectations in this regard.

In step 150, the host computer constructs and then sends multiple probe packets, each addressed to the source address identified in the request packet. Such probe packets preferably are sent using the User Datagram Protocol (UDP) which is designed for connectionless messages, such as probe packets. It is noted that this is the same protocol used to send probe packets in conventional traceroute operations. Also, as in conventional traceroute techniques, the probe packets preferably are addressed to a port that is unlikely to be in use by the requestor, causing a Port Unreachable message to be returned when a probe packet reaches the requester. In fact, subject to the discussion below, it can be assumed that the probe packets sent according to the present invention may have any of the characteristics of probe packets sent according to conventional traceroute operations.

Even staying within the TCP/IP protocol suite, protocols other than UDP may also be appropriate choices to use in formatting some probe packets. For example, the ICMP Echo Request packet might well work as well, or even better, since it avoids the possibility that the conventional traceroute "UDP port unlikely to be in use" might actually be in use, thereby leading to the probe packet's ultimate destination not sending any response to the probe.

Another choice that would avoid that possibility would be sending a raw IP packet with a value for the "protocol number" that does not correspond to any of the protocols defined to have protocol numbers in that field. According to the ICMP specification (Internet RFC 792), the recipient of an IP packet with an unknown "protocol number" should always respond with a Code 2 (Protocol Unreachable) ICMP Destination Unreachable response. By comparison, the UDP probes sent by conventional traceroute and its derivatives trigger a Code 3 (Port Unreachable) ICMP Destination Unreachable response.

When implementing the techniques of the present invention using protocol suites other than the TCP/IP protocol suite, it is generally not advisable to use any of the specifically above-mentioned probe packet types, as all of the above-mentioned probe packet types are IP-based. Accordingly, it is presently preferred to use the "UDP port unlikely to be in use," although this preference may change pending further study and experimentation. There are at least two reasons for this:

(a) There is no body with the authority to enforce correct implementation of the TCP/IP protocol suite. Accordingly, less-used features of the suite are often not implemented in quick-and-dirty TCP/IP implementations, and sometimes even in full-featured implementations, are not exercised with the same frequency that the more commonly used features are exercised. Accordingly, the features needed for the alternative probes may not be as widely available, or may not have been implemented correctly.

(b) Most ICMP requests should "never trigger an ICMP response", according to RFC 792. In implementations that follow this specification, ICMP Echo requests will never trigger a TTL Exceeded response. Therefore, the ICMP Echo requests, although appropriate for probing the final node in a connection, might not be useful for probing intermediate nodes along the path. Some of the efficiency of the technique for geographic locating according to the present invention comes from its use of a single type of probe packet to elicit responses from both intermediate nodes and the path's destination.

It is noted that, in conventional traceroute, it is desirable to identify the entire route that a packet takes. However, in the present invention, it is generally only desirable to identify the router or exchange point closest to the requestor. Accordingly, it typically will be preferable to send probe packets having TTL values that are within a few hops (such as any integer within a range of approximately 1 to 7) of the number of hops taken by the request packet. Moreover, the order of transmitting such probe packets preferably is relevant, and the preferred embodiment targets the first few routers on the inbound route first, with preference given to earlier routers over later routers. For example, it is currently preferable to send probe packets with TTL values in the following order: t−1, t−2, t−3, t, t+1, t−4, t−5, t+2 and t−6, where t is the number of hops identified in step 148. Depending on processing and other demands, the foregoing sequence may be truncated at any point or expanded to include additional TTL values.

Also, the present invention may be implemented by initially sending out probe packets with TTL values within a relatively narrow band (such as the sequence shown in the preceding paragraph), and then widening that band later in the event that the initial band fails to identify the appropriate routers. As a still further alternative, if the initial band fails to identify a relevant router, a brute force probing method, such as a probing technique similar to conventional traceroute, may then be employed.

The actual order of sending probe packets (i.e., the bracketing strategy) may change with time as the Internet develops and as prevailing TCP/IP implementations and network policies change. Also, the bracketing strategy will vary if it is determined that the present requester is likely to be connected to the network via a previously discovered asymmetric routing path or if it is expected that a link in the path commonly uses, or may in the current case be using, multi-path routing. In such a case, the host preferably either performs a full traceroute-like operation or else merely adjusts the value of t used above to account for expected differences in the applicable asymmetric or multi-path routing.

The present invention preferably sends out such a sequence of probe packets without waiting for replies in response to the earlier packets. It is noted that this strategy is different from that of conventional traceroute operations, and can provide for faster identification of the geographic location of the requester.

Finally, the present invention can guard against packet loss by sending out additional probe packets for each particular or for all TTLs in the bracketing strategy. The number of probe packets that are sent at each TTL value will depend upon various engineering trade-offs, such as the value of the location information, the expected datagram loss rates, the cost of bandwidth, the availability of bandwidth, network congestion control policies, and/or whether the initial portion of the route from the server to the client is already known, is of interest, or is even likely to be relevant. Such repeat probe packets can be sent, for example, in clustered format (e.g., 3 packets with a TTL of t–1, then 3 packets with a TTL of t–2, etc.), in a repeating sequence format (e.g., sending one packet for each TTL value in the sequence and then repeating the entire sequence), or in any other format. Preferably, however, the format is designed to obtain earlier responses from the initial routers in the inbound route and to reduce the statistical likelihood that two or more packets with the same TTL values will be lost.

In step 152, responses to the probe packets are received and associated with the corresponding probe packets. For instance, this association can be facilitated by uniquely encoding each probe packet.

In step 153, the host checks to determine whether the responses from the initial set of probe packets indicates asymmetric routing, multi-path routing or any other routing anomaly. Such a situation will occur, for example, if the response corresponding to the probe packet having a TTL value of t did not originate from the requester or if any response corresponding to a TTL value less than t did originate from the requestor. In an ordinary situation with symmetric routing, the response to a probe packet having a TTL value of t (but not the response corresponding to a TTL value of t–1) will be an ICMP Port Unreachable packet. If this is not the case, then it may be determined that either: (i) asymmetric routing, multi-path routing or another routing anomaly has been discovered or (ii) the assumption in step 148 regarding the initial TTL value for the incoming request was wrong. Thus, additional processing may be performed to verify the existence and identify of such anomalous routing. In the event that such a situation is identified, an alternative probing strategy (such as a full "shotgun" approach that runs a modified traceroute program that does not wait between packet transmissions) is performed in step 154 (e.g., using probe packets having TTL values ranging from 1 to 30 or from 1 until an ICMP Port Unreachable packet has been received). Upon completion of such alternative probing operation and verification of an anomalous routing situation or non-standard initial TTL value, the existence of such situation can be stored in a database for future reference (e.g., in step 148 and/or step 150). It is noted that such additional probing for anomaly detection may occur either in real time, offline or using a combination of the two.

In step 155, the source addresses of the responses to the probe packets are matched to a database in an attempt to identify geographic locations of the corresponding routers. Specifically, the server consults a previously collected database of exchange points and finds the last known exchange point closest to the requestor. If the last known exchange point can be identified as a launch point for local distribution, then the requesting host can be identified as being in the geographical location serviced by that exchange point. Alternatively, such information can be compared to other geographic information regarding the requestor (e.g., user-supplied information) for confirmation.

Generally, the last known exchange point can be identified by: (i) identifying all responses from the original requestor (e.g., the ICMP Port Unreachable message), (ii) identifying the smallest initial TTL value (N) for a probe packet corresponding to such a response, and then (iii) identifying the response packet corresponding to the probe packet having a TTL value which is one less than N. If the geographic location of the source for this response packet cannot be determined by looking up the source's IP address (or other network identifier) in a database (e.g., because a database entry does not exist for the address or because the database indicates that the associated geographic location may not be sufficiently reliable), then the response packet corresponding to the probe packet having a TTL value of two less than N is examined. This process continues, working back from the original requestor until the geographic location of a router can be reliably determined (or a combination of information for plural routers provides sufficient reliability).

In step 156, the geographic location of the requestor is identified. Generally, this will be the geographic location of the last known exchange point closest to the requestor. However, as indicated above, in certain embodiments a composite geographic location may be provided based on information for plural different routers. Depending upon how large an area is served by the identified exchange point, the geographic location of the requestor may be known with more or less precision.

For example, if the last known exchange point is within p hops of the requestor, the geographic information can be treated as specific information. Otherwise, the geographic information can be treated as a regional indication of where the requestor is located. In this regard, p can be constant, such as 1, 2 or 3. Alternatively, p can be varied based on the indicated geographic region. For example, p might be specified to be a larger number in the Silicon Valley where there are many exchange points and a smaller number in rural areas where there are fewer exchange points within the same geographic region.

In the preferred embodiment of the invention, an improvement over the "Closest Known Neighbor Heuristic" is applied. This heuristic addresses the problem of locating a node x given that x has an unknown location and that one has a map or trace of a packet's path through several nodes including x. If one or more other nodes on the path have known locations, then the heuristic assumes that x is at the same place that the closest (or previous or following) node with a known location is located.

If all of the backbone carriers' nodes at the major exchange points have been located, then it is guaranteed that all unidentified nodes past the last known node must be in the geographic area served by that last known node. Moreover, if the host has a catalogue locating all of such well-known exchange points, or network access points (NAPs), and currently there are few enough of such NAPs that it is practical to catalogue them, then the destination must be served by that NAP. This heuristic is referred to herein as the "Closest Significant Exchange Point Heuristic".

The same heuristic can be applied in a similar manner further down the tree by narrowing the heuristic's geographic scope. For example, if one knows the locations of all of the routers for a cable company's network, then all nodes on the network can be located at the granularity of the individual cable trunk served by each router.

It is also noted that this geographic information can be updated or identified more accurately as additional information is received from the requester. For example, in the event that the requestor submits an on-line purchase order with a delivery address, provides a billing address, or otherwise provides address information, such provided information can be used to more accurately pinpoint the requestor's location. In the event that such provided address information conflicts with the geographic information identified using the probing technique described above, the host may continue to use the geographic information identified by probing or else use the provided address information, as appropriate to the particular circumstance. For instance, if the probe packet technique described above indicates that the requestor is located in Western New York, but the requester provides a billing address of Raleigh, N.C., the host may continue to use the Western New York information while storing the Raleigh, N.C. address as an alternate address or a possible permanent home address. In this case, after collecting information for a period of time, it may turn out that the requestor's permanent home address does in fact appear to be Raleigh, N.C., but that the requestor frequently travels to different cities. In this event, depending upon the particular information to be delivered, it may be preferable to utilize both the current temporary address (e.g., for restaurant or store advertisements or for weather information) and the requestor's permanent address (e.g., for advertisements for real estate brokers or for news reports). A conflict might instead mean that the requestor simply had dialed into a POP from a geographic location not ordinarily served by the POP, such as where the requestor is traveling or has recently moved but has not updated his POP access telephone number. In any event, the geographic location identified in step 156 is first cached in step 158 and then provided to the communication process of step 160 for use in providing geographic-specific information to the requester.

In step 158, the identified geographic information is cached for future use. As part of the dynamic database upkeep, data previously acquired about specific IP addresses (including the source IP addresses) are cached for use in the common case of repeated requests (such as return visits to a Web site) from the same IP address. In this case, the route corresponding to the subject IP address has already been traced and the geographic heuristic already applied. This information can be re-used, thus lessening the load on the network and on the server's database and computational resources. However, it may not always be possible to re-use specific geographic information for a particular IP address. For example, IP address allocations may change over time. Thus, the exact geographic address associated with a particular address at one point in time (e.g., such as provided pursuant to an on-line order) sometimes will not correspond to a much later request from the same IP address, as that IP address probably will have been reassigned to a different user. Accordingly, in the preferred embodiment of the invention, such cached information is determined to be relevant only if it has been updated within a specified period of time. The exact time period will vary based on expected tradeoffs, with shorter time periods requiring more frequent probing, together with the attendant overhead, and longer time periods increasing the likelihood that the cached information will be in error.

In step 160, the provided geographic information is used to provide geographic-specific content to the requester, such as local weather, advertising, maps, and places of interest, as well as somewhat more generic information, such as content that is based on time zone (e.g., a "good morning" greeting) or climate in the requestor's region. In addition to using the geographic information obtained above for targeting content, such information may also be used for other purposes, such as marketing research and/or other types of surveys and research.

Additional Considerations Regarding Geographic Locating.

Figure 2:
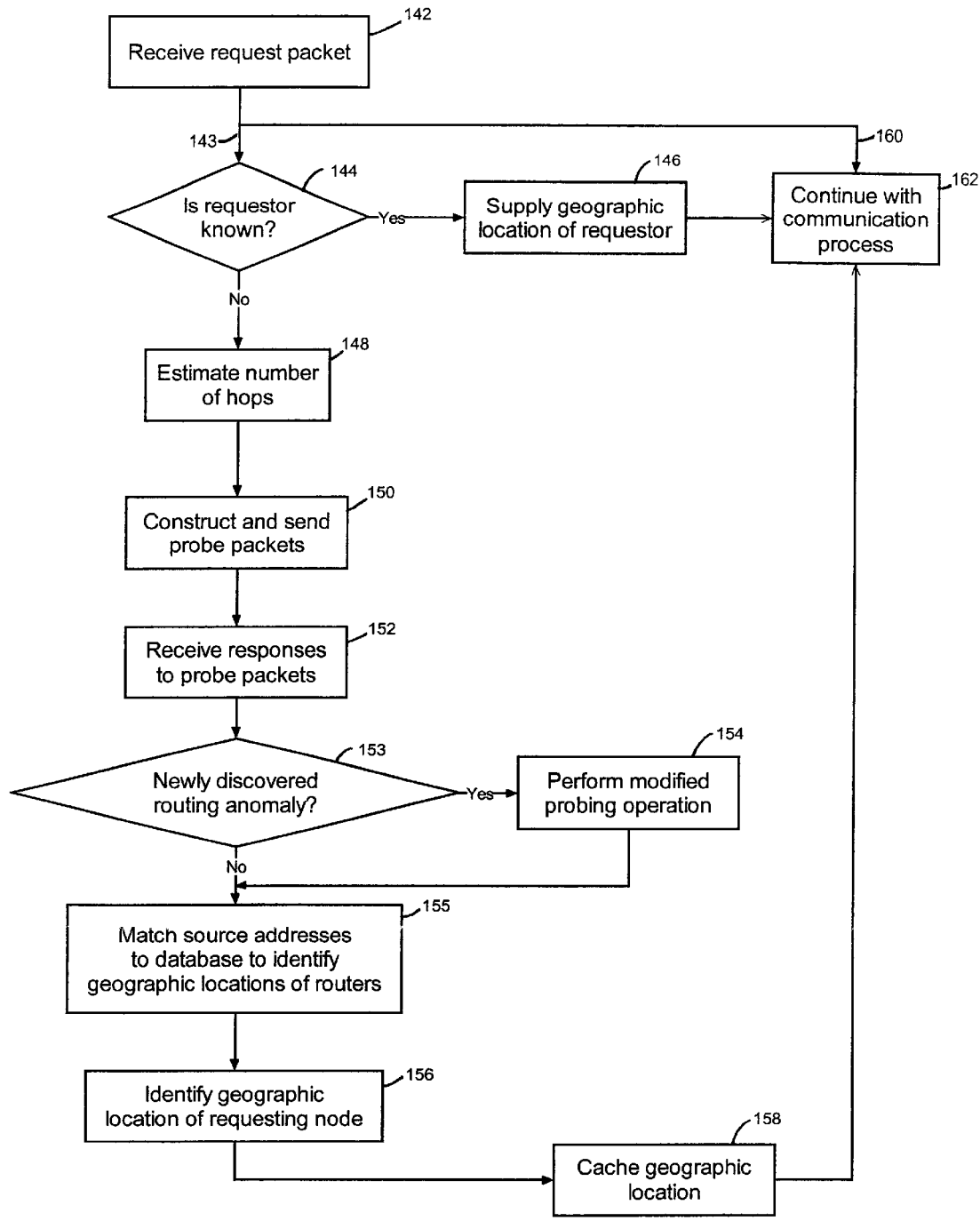
FIG. 2 is a flow chart illustrating steps for forecasting a geographic position of a network device according to a representative embodiment of the present invention.

Although the steps are illustrated in a particular order in FIG. 2, it should be understood that the precise order of such steps may be varied to achieve different results, and certain steps may even be performed simultaneously in order to reduce the amount of time required to obtain a geographic position for a node on the network. For instance, any or all of steps 152 through 158 may be initiated prior to completion of step 150 and performed simultaneously with step 150 for a period of time.

In one embodiment, for example, each packet received at step 152 preferably will repeatedly cause steps 153 through 158 to be executed as far as applicable, with step 156 succeeding only once the probes have yielded sufficient information with which to draw a conclusion about the geographic location of the requesting node. Once step 156 has been successfully completed, the concurrently executing step 150 is asynchronously terminated. Any unsent probes in the probe sequence preferably will not be sent, as they are no longer relevant and generally will only serve to unnecessarily consume resources because the process has already arrived at a conclusion in step 156.

Furthermore, in the preferred embodiment of the invention, step 154, "Perform Modified Probing Operation", will similarly modify the probe sequence being performed by step 150. Specifically, unsent packets in the rest of the original probe sequence will not be sent, and instead a new "rest of the probe sequence" will be constructed (i) from information about what packets have already been sent and (ii) from conclusions reached by step 154 about what probes need to be sent in the modified sequence. Preferably, the information in part (i) is considered in conjunction with that in part (ii), rather than simply naively following the sequence that would be generated by considering only part (ii) information, so that the host can avoid initiating probes that merely unintendedly duplicate probe packets that are already in progress. Nevertheless, the probe sequence generated by in step 154 may deliberately contain duplicates. The integration of information from parts (i) and (ii) referenced above is only intended to avoid sending unintended duplicates that would not otherwise be part of the probe sequence that would be suggested by the part (ii) information alone.

Even at and after step 158, when no new probes are initiated, there often will be probes or replies still traversing the route between the requesting node and the server. It typically will be useful to record any responses the host receives to the outstanding probes in progress, as these serve as additional data for the "slow-side" analysis mechanism. On the other hand, if recording these late responses would impair the performance of the web server or other aspects of the entire system using the geographic locating technique according to the present invention, then any late responses may be simply ignored or discarded. In any case, in the preferred embodiment, waiting for late responses is not blocked. In modern higher level programming languages, this is most conveniently implemented by having the response recording mechanism be a separate process or thread of control within the overall mechanism.

In order to avoid any speed loss from recording the late responses for potential future analysis, one may implement a response recording mechanism, e.g., on a separate computer, that eavesdrops on the network traffic to and from the primary host computer on which the above mentioned process is executed. The separate computer then passively eavesdrops on that network traffic and records probes and their results on some local storage medium for future analysis, without generating any additional network traffic that might slow down the processing being done by the primary host computer.

Creating and Updating the Geographic Database

As indicated above, one feature of the present invention is the creation and use of a database containing geographic information for known exchange points. While it is possible to use multiple databases from various sources that are available over the Internet, accessing such different databases typically will consume additional time, which may be a significant detriment where delivery of real-time geographically targeted content is desired. Accordingly, it is preferable to use a single database and to dynamically update that database as new information is learned.

As the host acquires additional information about requestors' actual locations, for example by taking on-line orders and noting delivery and billing addresses, these data can be stored to more accurately identify the location of a particular requestor. In addition, such data may be compiled and analyzed for common pathways to (perhaps formerly unknown) exchange points, leading to on-the-fly addition of known exchange points. Moreover, if in a given case the result based on responses from the probe packets differs from the location reported by a requestor, the database maintenance system may be able to heuristically determine a change in the network's topology. On the other hand, as noted above, if the two locations are sufficiently different, then it may be determined that the requestor utilizes multiple locations (e.g., a permanent home location and a temporary travel location).

Also, in the event that a discrepancy cannot be resolved automatically, the system may notify a human operator of the discrepancy, thus permitting a human database administrator to resolve the discrepancy. As such an administrator begins to identify recurring discrepancies, the resolutions for those discrepancies can be incorporated into the system's heuristics. As a result, over time, more and more of such discrepancies typically will be able to be handled automatically by the system. Still further, the system's heuristics may themselves be updated automatically, e.g., by utilizing known neural network techniques which learn based on the corrections and resolutions made by the human database administrator.

Prior to actual implementation, the database preferably is seeded with available information sources, such as data extracted from the Internic host and other sources of network registrations that are available, lists of locations of exchange points for various ISPs, and reverse telephone lookup information for ISPs' access telephone numbers. Where location/address information is linked in the database, such information preferably is flagged in the database to indicate whether the location associated with each network address is the location where the router for that network address is known to be located or simply one location for an entity that utilizes a number of routers in different geographic locations. ISPs typically fall into the latter category, so that network registration information for an ISP often indicates a single geographic location for all IP addresses assigned to the ISP, even though in actual usage different blocks of such IP addresses may be used by the ISP in different geographic locations. Although such latter type of information may not be capable of immediate direct use, it may be combined with other information (e.g., a list of exchange points for the ISP, reverse telephone lookup information for the ISP's access telephone numbers, and/or network probing information, such as obtained as described above) to yield more precise geographic location information.

In addition to the foregoing techniques for seeding the database, the present invention also contemplates seeding and updating the database with data generated by a computer program, referred to herein as the Dial-up POP Locator (DPL), as described below. We begin with a brief discussion of some relevant background.

PPP, the Point-to-Point Protocol, is a framing protocol normally used to carry datagrams (especially IP datagrams) on top of a noisy byte stream connection, most commonly a modem connection. Commonly, when a dial-up Internet user makes a telephone call to initiate an Internet session, the following steps occur. We shall refer to the dial-up Internet user's computer as the "client".

1) The client's modem makes a physical telephone call to the telephone number of a modem at a Point of Presence (POP), where the POP is a single location of the user's ISP.
2) The modem at the POP answers and establishes a modem connection with the client's modem. The client computer and the POP can then send information to each other.
3) The client and POP use the modem channel to mutually establish a PPP connection. In establishing a PPP connection, the POP assigns a temporary IP address to the client and informs the client of this temporary address.
4) The client can now send IP packets that the POP will route to the larger Internet. From the perspective of another host on the Internet, the client and POP are just ordinary Internet nodes, with the POP behaving just like any ordinary router between the client and the larger Internet.

Internet Service Providers commonly provide multiple POPs in different geographic locations for their customers. Their intent in doing so is to make it possible for customers to make local telephone calls to the POP, since it is much more attractive for a customer to use the Internet if the customer does not have to pay per-minute toll charges for the telephone connection, in addition to any fees to the ISP. Internet Service Providers commonly distribute lists to their customers of all of their POPs, the telephone access numbers to those POPs, and their geographic locations. These lists are especially useful for customers who travel, because they can often find a local telephone access number regardless of where they are.

The following describes an implementation of a DPL according to a representative embodiment of the invention. Initially, the user of the DPL will arrange accounts with a variety of national and local ISPs. In addition, from these ISPs, the user obtains lists of the modem phone numbers of the ISPs' POPs and the geographic location for each POP. The DPL user may not wish to gather information about all locations; instead, the DPL user may focus on a single region, state, nation, or other area of interest. In this case, the DPL user then selects all of the modem telephone numbers whose locations are in the DPL user's region of interest.

One component of the DPL, the "DPL dialer", then dials (preferably automatically) all, or all selected, numbers on that list. Each time it establishes a PPP link to a POP, the DPL dialer will send an Internet message via that PPP link with a destination address of the DPL data-gathering server (DGS). Actually, the DGS need not be a "server" in a conventional sense, but rather any network device that can receive messages from the dialer. Also, the dialer and the DGS may be housed in the same device, sharing a network connection or having separate connections.

The DPL dialer's message preferably includes information telling the DGS: which phone number the DPL dialer called, which city and state were in the ISP's modem list associated with that phone number, which ISP the DPL dialer used, and any additional bookkeeping information that may be helpful for debugging or further development purposes. Alternatively, the message sent by the DPL dialer may merely provide the minimal information required to uniquely identify the POP that it is using (together with any debugging or other similar information). In this latter case, the DGS preferably has access to a database that contains all other necessary information (such as the listed information) regarding each POP, which database may be shared with the DPL dialer. In either case, one way for the DPL dialer to send such messages to the DGS is to simply open an HTTP/TCP connection.

The DPL dialer message generally also will include the IP address temporarily assigned to the client. Accordingly, the DGS associates such source network address with the known geographic location for the POP in its database, preferably by creating a new entry in the database.

Upon receipt of such a message, the DGS preferably also initiates a probing operation (e.g., a full traceroute or similar technique for determining all routers along the path, or any other dynamic probing, such as that described above) in order to obtain more information regarding the routing path between the POP and the DGS. In the case of probing for DPL purposes, the real-time requirements mentioned above generally are not as significant as when communicating with a human Internet user. Therefore, some of the tradeoffs made in the above-described dynamic real-time ICMP probing will be made differently in the DGS ICMP probes. More specifically, it is believed that most users of the DGS will favor thoroughness over speed, for the sake of establishing a more reliable database.

In connection with such probing, the DGS records the trace of nodes on the route, as well as the associated geographic location, telephone access phone number, and ISP, and any other debugging or bookkeeping information that may be appropriate to the DPL user's specific needs, to the extent such information has been transmitted to the DGS and is not already stored in a database accessible to the DGS.

It is noted that almost all Internet dial-up users will be making a local telephone call to whatever POP they are using. As indicated above, even when traveling, a customer will tend to make a local telephone call to a local POP. Therefore, customers are almost always located within a local calling radius of the POP that they are using. Accordingly, locating the POP makes it likely that we have located the customer using that POP to within a level of granularity of a local telephone calling circle around the POP, or at least to a level of granularity defined by the local toll-free calling area that includes the POP.

Preferably, a user of the DPL dialer makes a number of calls to each POP. This is in order to ensure that a consistent pattern develops. In this regard, it is noted that some dial-up phone numbers may occasionally re-route calls during congested times to a backup less-loaded POP. By making a number of calls at times of the day with different load conditions, we can identify such nodes.

Once the calls are completed, the DGS looks for the common nodes on the path to each location. For this purpose, the DGS analyzes at several levels of coarseness (i.e., granularity or resolution). Smaller individual locations with POPs, such as Santa Monica, Malibu, and Redondo Beach, may be grouped into a single entity, such as "LAX Metro", at a coarser granularity of location resolution. In turn, "LAX Metro", "San Diego Metro" and "Orange County" may be grouped into yet another single entity, such as "Southern California". The various locations in California, Oregon, and Washington, in turn, may be grouped into yet a coarser-grained entity, such as "West Coast of USA".

At each granularity, a node may be found in traces made to several entities at that granularity, or may only be found in traces made to one of the entities at that granularity. If a node is found only in traces to one entity, X, at that granularity, we can refer to that node as a "determining node" for that granularity. The presence of a "determining node" in a trace is strong evidence for determining that the destination of that trace is located in entity X, and we can identify each "determining node" as being located within entity X. On the other hand, if a node is found in traces to several entities, then that node is not a "determining node", and it should be marked instead as being a "shared node" at granularity X. By applying this heuristic, the DPL's heuristic can discover determining nodes for many granularities of resolution.

In order to gather additional information, in an alternative embodiment of the invention, the DPL is deployed with more than one DGS, in more than one geographic area. The DPL dialer then sends Internet messages to all of the DGSs, and each DGS gathers its own route traces, as described above for a single DGS. These additional route traces provide additional corroborating evidence, permitting confirmation that nodes are in fact determining nodes, rather than nodes that only appear to be determining nodes from one particular direction.

The DPL can also be used to confirm the validity of an existing location database. If it is determined that there exists an inconsistency between where the ISP's list says the POP is located, as determined by the DPL, and where the probing technique according to the present invention determines that the POP is located, then it is preferable to first confirm that the location information on the ISP's list is not incorrect. This often can be done with a publicly available list of the locations of telephone exchanges. Then, a variety of means can be used, either manual ones or automated ones, such as a classic Artificial Intelligence Truth Maintenance System, to determine how the inconsistency arose, repair the location database, and possibly revise the data gathering method that led to the discrepant data.

The foregoing technique can provide a database of exchange points at the layer of network topology necessary in order to provide the desired precision for a geographic location. As noted above, a map of NAPs ordinarily suffices to identify the user to the precision of the area served by that NAP, and similar approaches can be used to obtain finer levels of granularity. As used herein, "precision" refers to the granularity at which location information is available, and "accuracy" describes the likelihood that a technique will yield the proper location at a given precision.

Further embodiments of the present invention provide accuracy guarantees by applying known statistical methods to the input sources of location data, and measuring their completeness, accuracy and precision. From the precision estimates associated with each such piece of data that contributed to identifying a particular location, an accuracy estimate can be derived for that identification.

Additional methods also can be used for seeding of the location database. Such techniques can be used either individually or in various combinations. For example, the host names of hosts along a traceroute path can be parsed according to the naming conventions used by various ISPs. For example, the following lists certain domain names and their corresponding geographic locations.

LAX3.ALTER.NET Los Angeles, Calif.
gbr3-p00.la2ca.ip.att.net Los Angeles, Calif.
gr1-p3100.sffca.ip.att.net San Francisco, Calif.
101.ATM0-0-0.DR1.KRK1.ALTER.NET Kirkland, Wash.
att-gw.sf.uu.net San Francisco, Calif.
tnt6.redondo-beach.ca.da.uu.net Redondo Beach, Calif.
s4-1-1.1sancal-cr3.bbnplanet.net Los Angeles, Calif.
p1-0.paloalto-nbr1.bbnplanet.net Palo Alto, Calif.
p76.cil.herndon.va.us.psi.net Herndon, Va.
borderx2-hssi3-0.Los Angeles.cw.net Los Angeles, Calif.
tnt5.murrieta.ca.da.uu.net Murietta, Calif.

Typically such parsing may require an auxiliary database of airport codes and/or a database of the city codes used by various ISPs, as well as their naming patterns. Generally, such databases will be produced manually.

Another technique for seeding the location database is to essentially eavesdrop on the routing tables used by the NAPs. This can be accomplished by consulting the Routing Arbiter Database and/or by eavesdropping on the internal routing protocol (usually RIP or RIP2) traffic at each of the NAPs. For example, by installing a network host at each of the NAPs of interest (such as a small number of the major ones or all of such NAPs) a host according to the present invention can eavesdrop on such traffic. Such special network hosts will then contribute updates to the routing information for use in the host's location database.

With regard to the foregoing, as a general rule it can be asserted that any traffic whose next hop out of the NAP is not to a backbone router, must be to a local network. Therefore, that network's routing prefix (appropriately masked block of network numbers) typically hangs entirely off of that NAP, and is therefore in the metropolitan area served by that NAP. Based on this information, it generally will be a relatively straightforward matter to determine when an IP address is located within an area served by an identified NAP. This technique also may be used to identify a geographic location for a source network address included in an incoming request, i.e., by utilizing the location of a NAP that corresponds to such network address.

Hasty Listening.

In a preferred embodiment, the present invention implements a "hasty listening" technique that allows a TCP application according to the present invention to receive notification of an incoming request sooner than conventional techniques ordinarily would permit. Specifically, in conventional techniques, the TCP application is not notified regarding an incoming communication until after completion of a process known as the "Three-Way Handshake", which is used in establishing a TCP connection. However, according to the hasty listening technique of the present invention, the TCP application is notified as soon as the SYN packet is received, which is the first step in initiating a TCP connection. Hasty listening thus reduces the time during which an application must wait for geographic information about the request's originator to be gathered. Using hasty listening, a TCP application will identify the IP address of the originator of an inbound TCP connection without having to wait for completion of the Three-Way Handshake. As a result, the process of obtaining a geographic location for such requestor (e.g., steps 143, et se. in FIG. 2) can often be initiated much sooner than conventional techniques would permit, thereby resulting in faster geographic positioning.

It is noted that one method of launching Denial of Service (DoS) attacks is to send TCP SYN packets with a forged source address. The TCP three-way handshake ordinarily will not be completed in the case of such an attack, because the host at the forged source address will know that it did not initiate the handshake to which the TCP listener is responding. However, this type of DoS attack will cause a host using Hasty Listening according to the present invention to waste resources determining the geographic location of a nonexistent peer. Therefore, hosts using Hasty Listening may be more vulnerable to this type of DoS attack.

There are security features in some TCP implementations which detect "SYN Flooding" DoS attacks. These security features will be useful in such a situation. A host using Hasty Listening according to the present invention preferably uses this security feature to aggressively attempt to detect possible SYN Flooding and to stop using Hasty Listening for a time when such a detection has been made.

It is also noted that location information caching, as described above, may reduce the amount of network traffic that a system according to the present invention generates when it receives a DoS attack. This, in turn, often will tend to reduce the severity of the cascade effect which otherwise would result from repeatedly probing some target that is an innocent additional victim of the DoS attack.

Application Programming Interfaces.

In order to implement the functionality described above, in a preferred embodiment of the present invention, several new application programming interface (API) extensions are defined. In the following discussion, it is assumed that these extensions are being made to the standard "Berkeley Sockets" TCP/IP Application Programming Interface (Sockets API) used, for example, by Unix™, Linux™, Microsoft™ Windows™, FreeBSD™, and other operating systems. However, it should be understood that the following discussion is not limited to extensions to the Sockets API. Rather, the Sockets API is simply used as an example because currently it is the most common implementation. The names used below also are merely exemplary. It should be noted that the concepts discussed below can be readily extended to other systems and other implementations within those systems, as will be understood by those skilled in the art.

Specifically, in the preferred embodiment of the invention, new extensions are provided in order to effect implementation of hasty listening and to retrieve the TTL value for an incoming request packet. We begin with a discussion of conventional Sockets API. In particular, the following is a typical sequence of Sockets API function calls that a TCP server might make. In the following list, the thread that initiates the function call is indicated in italics and parentheses and is positioned between the function call and the description of the function call. Initially, the server has a single thread of control, the Master Thread.

I=socket ( . . . ) (Master Thread) Creates a socket, I.

ioctl (I, . . . ) (Master Thread) Sets options for I's behavior and query information about I's status.

bind (I, p) (Master Thread) Binds I, to a specific TCP port, p.

ioctl (I, . . . ) (Master Thread) Possibly set additional options for I's behavior. Possibly request additional information about I's status.

listen (I, . . . ) (Master Thread) Tells the TCP stack to begin accepting connections to TCP port p. When a connection is established from a remote client to port p, that connection is added to I's "connection backlog". A connection is only added to I's "connection backlog" when the TCP three-way handshake process is completed and the connection is fully established.

c=accept (I, . . . ) (Master Thread) if there is no established connection on I's connection backlog, wait until a new connection, e, is established to p; e will now be the only connection in I's backlog. If I already has a backlog, then let e be the first connection in I's backlog. e is now an established connection in I's backlog. accept ( ) removes e from I's backlog, creates a new socket, c, and associates c with e, accept ( ) then returns c. The newly-minted socket c refers only to e.

Create Worker thread (Master Thread) Usually spawn a worker thread t or subprocess t to handle the data from c. This invokes system functions that are outside the scope of the Sockets API.

ioctl (c, . . . ), getpeername (c, . . . ), (Worker thread) Get information about the connection e associated with the socket c.

select ( ) (Worker t) Check whether there is data to be read on the socket c. The socket c will have data if the remote network peer has sent data to the server over the TCP connection e.

Process data (Worker t) Read the pending data and send any replies needed. The exact calls used to send and receive data are not important for this discussion.

Close socket c (Worker t) The work is done. Tell the TCP stack to shut down the connection e.

Terminate thread (Worker t) t has no more work to perform and terminates itself.

One of the function calls described above, ioctl( ), can be used to query transient information about the connection and set aspects of its state that do not fit neatly into any other standard system operations. The function calling signature for ioctl ( ) is:

ioctl (socket, operation, optional-parameter)

The operation parameter can indicate any operation or status query that the API user may wish to perform on the socket. In the case of a status query, one provides an optional-parameter in order to store the results of the query. The interpretation of optional-parameter depends upon the particular operation being performed. In the case of modifying some characteristic of the socket, the use of the optional-parameter depends upon the particular operation, and there are some setting operations that do not require an optional-parameter.

When a user of the Sockets API requests an ioctl( ) operation that is not defined or not appropriate for socket, the API typically returns the standard ENOIOCTLCMD error. Similarly, an API user using the new ioctl( ) operations defined below will get an ENOIOCTLCMD error if using a TCP implementation that does not support the enhancements described below.

The setsockopt ( ) and getsockopt ( ) API calls are intended to modify more persistent aspects of sockets. Their function calling signatures are similar to that of ioctl ( ) and are not discussed here in detail. There are well-known socket options that are common to all implementations of the Sockets API. In addition, each implementation of the TCP/IP Sockets API may have its own implementation-specific named/defined operations.

When a user of the Sockets API requests a setsockopt ( ) or getsockopt ( ) operation that is not defined, the API returns the ENOPROTOOPT error. Similarly, an API user using the setsockopt ( ) and getsockopt ( ) operations, defined below, will get the ENOPROTOOPT error if using a TCP Implementation that does not support the enhancements described below.

The function calling signature for select ( ) is:

select(n, (maybe-)readable-sockets, (maybe-)writable-sockets, (maybe-)exceptional-conditions-sockets, timeout)

select ( ) checks whether one or more sockets can have certain API calls made on them without that call "blocking". If an API call "blocks", that means that the TCP implementation must wait for something to happen before that API call can be completed.

select ( ) is important for programs that need to interact on several communication channels at the same time. There are many programs that use the Sockets API and never call select ( ); these programs all use a single communication channel at a time. When these programs make potentially blocking calls to Sockets API functions, they typically wait until the calls complete.

The common use of select( ) in the Sockets API is to check whether data is available to be read on one or more connected TCP sockets. If, when select( ) returns, it has indicated that some connected TCP socket, c, is among the readable-sockets, then a program calling the standard Sockets API read( ) function call on c will get back data immediately. The socket c will have data if the TCP implementation has received data over c's TCP connection, e, and has not yet returned that data in a previous use of read( ).

Most Sockets API programmers only use select ( ) on sockets or other I/O descriptors that are connected to a single established TCP connection or other established I/O channel. However, there is a special use of the select( ) readable-sockets argument, which we discuss here.

In classic Sockets API programs, such as 'inetd,' after listen ( ) has been called on a socket I, select ( ) is often called with the listen( )ing socket, I, as one of the maybe-readable-sockets. When a new connection, e, is established to I's TCP port, then e is added to I's "established connection backlog". If there is an established connection in I's "established connection backlog", such that an accept( ) operation will immediately return a usable connected socket, c, then I is considered "readable" for the purposes of select ( ).

More formally, let I be a listen( )ing socket. If select( ) returns indicating that I is in the set of readable-sockets, then this means that there is at least one established connection, e, in I's backlog. Therefore, c=accept (I, . . . ) can be called without blocking, since accept (I, . . . ) will immediately return a new connected socket c.

It is noted that I is not actually "readable" in the normal sense of the word; a read( ) API call on I will fail. However, select( ) uses the readable-sockets parameter to represent information about I's connection backlog. This is an arbitrary convention; the writable-sockets or exceptional-conditions-sockets parameters would (arguably) have been equally appropriate choices.

As noted above, the extensions to the API according to the present invention allow two new capabilities: hasty listening and TTL value retrieval.

Hasty Listening API Extension.

We define a new setsockopt ( ) operation, SO_SET_HASTY_LISTEN. We can call setsockopt (I, . . . , SO_SET_HASTY_LISTEN, value, . . . ) with the value 1 to turn on Hasty Listening for I, a listen( )ing socket. Using value 0 instead of 1, will turn off Hasty Listening for I.

When a listen( )ing socket, I has had Hasty Listening enabled on it, then the arrival of a SYN packet that may be establishing a connection, C, to I will cause an exception to be registered for C. The exception remains registered until one of the following two events occurs:

(1) accept (I, . . . )is called; or (2) ioctl (I, SIOC_GET_SYN_PKT_INFO, . . . ) is called. SIOC_GET_SYN_PKT_INFO is a new ioctl( ) operation defined below.

As long as an exception is registered for some established or potential connection C to port p, select ( ) will continue to mark I as being in the set of exceptional-conditions-sockets and will immediately return to its caller. select( )'s standard behavior is not affected by the new feature described in the previous paragraph. In a TCP implementation that does not support Hasty Listening, setsockopt (I, . . . , SO_SET_HASTY_LISTEN, . . . ) will return an ENOPROTOOPT error.

If the ioctl( ) operation SIOC_GET_SYN_PKT_INFO is performed on a socket I in the listen( )ing state, and if I's backlog contains any established connection or pending connection which is in the "exception" state, then ioctl( ) will:

return a success status code (0);

fill the data structure pointed to by the value argument with the information about the SYN packet.

and clear the exception state for that established connection or potential connection.

If there is no established connection or potential connection on I in the "exception" state, then ENOMSG is returned; ENOMSG is a standard error defined to indicate "No message of desired type".

The lower level details of how Sockets API functions indicate error codes are as follows: Sockets API functions, such as ioctl( ) or setsockopt( ), return the constant integer value (−1); −1, by convention, indicates that some error occurred, but does not specify the error. ioctl( ) and setsockopt( ) specify the particular error by setting a standard data storage area, errno, to a small integer indicating one of the predefined system error codes. In the case of the ENOMSG error, we set the errno area to the constant ENOMSG, which is defined in a system file (include/errno.h).

If the socket argument to ioctl( ) is not in fact a socket, ioctl( ) returns the standard error code ENOTSOCK, which indicates "socket operation on non-socket". If the socket argument to ioctl( ) is not any sort of input/output descriptor, then ioctl( ) returns the standard error code EBADF, which is standardly defined to indicate "Bad File Number". If the socket argument is a socket that is not in the listen( )ing state, then ioctl( ) returns the standard error code EINVAL, which is defined to indicate "invalid argument".

SIOC_GET_SYN_PKT_INFO's value argument is a pointer to a newly defined structure, struct syn_pkg_info. The data fields we have defined for struct syn_pkt_info are:

| | |
|---|---|
| ttl | The TTL value of the received SYN packet. |
| peer | The IP Address of the peer or potential peer that is the recorded sender of that received SYN packet. |

The above data members provide information used in the current embodiment of the invention to optimize the initial probing time. There is additional information in the SYN packet that may be useful for other computer applications that use Hasty Listening; in order to obtain this additional information, additional data fields can be added to struct syn_pkt_info as needed.

API Extension for Retrieval of TTL Information

A new ioctl ( ) operation, SIOC_GET_TTL, retrieves information about the TTLs of IP packets that have arrived for the TCP connection c that socket represents.

ioctl (socket, SIOC_GET_TTL, which-packet)

Depending upon the implementation, which-packet may count fragmented and reassembled IP packets as:

one packet per IP packet fragment; or as one packet per reassembled (complete) IP packet or may arbitrarily, or according to predetermined criteria, vary its counting method, e.g., using the above techniques.

In a representative embodiment of the invention, the following values are defined for the which-packet parameter:

0 Gets the TTL value of the first SYN packet received by the connection c. 0 and −1 will be the most commonly specified values for which-packet. This is used in the present embodiment to begin the probing. A TCP stack implementing SIOC_GET_TTL should maintain this information for the entire lifetime of the connection, since it consumes only one extra byte of data in the connection's transmission control block, and mechanisms to recycle that byte are likely to cost more than the space it would save.

−1 Gets the TTL value of the most recent packet received by the connection. It is expected that −1 and 0 will be the most commonly specified values for which-packet.

This is used in the present embodiment to detect asymmetric routing, multipath routing, and other routing anomalies.

This information should always be available.

$i \leq -1$ The TTL value of the $(-i)^{th}$ most recent packet received by the connection. i is not related to the TCP sequence number; instead, i is based on the order of the actual IP packets received. In most embodiments, this will not be available for all (or even most) values of i, due to the necessity of imposing internal storage limits. We define the first most recent packet to be the most recent packet (−1), the second most recent packet to be the penultimate (−2), and so on. Note that the case defined above for which-packet =−1 is a special case of this more general case.

$i \geq 0$ The TTL value of the $(-i)^{th}$ packet received by the connection. i is not related to the TCP sequence number. Implementations should set a limit on the number of packets for which TTL information is retained, in order to avoid excessive internal storage requirements. We define "packet number zero (0)" to be the first packet received by the connection c. Therefore, the case defined above for which-packet =0 is a special case of this more general case.

It should be noted that the specific values used above are not critical, and any other values may be used instead. Similarly, in many embodiments of the invention, it will only be desirable to retrieve the TTL value for the most recent packet received (the −1 case above) and/or the TTL value for the SYN packet (the 0 case above). However, if used, both the $i \leq -1$ and the $i \geq 0$ cases can be used in the technique of the present invention to detect asymmetric routing, multi-path routing and other routing anomalies. On the other hand, the TTL of the most recently received IP packet generally will be sufficient: (a) to perform strategic optimized probing based upon that TTL; and (b) to detect routing anomalies.

Design System Environment

Figure 3:
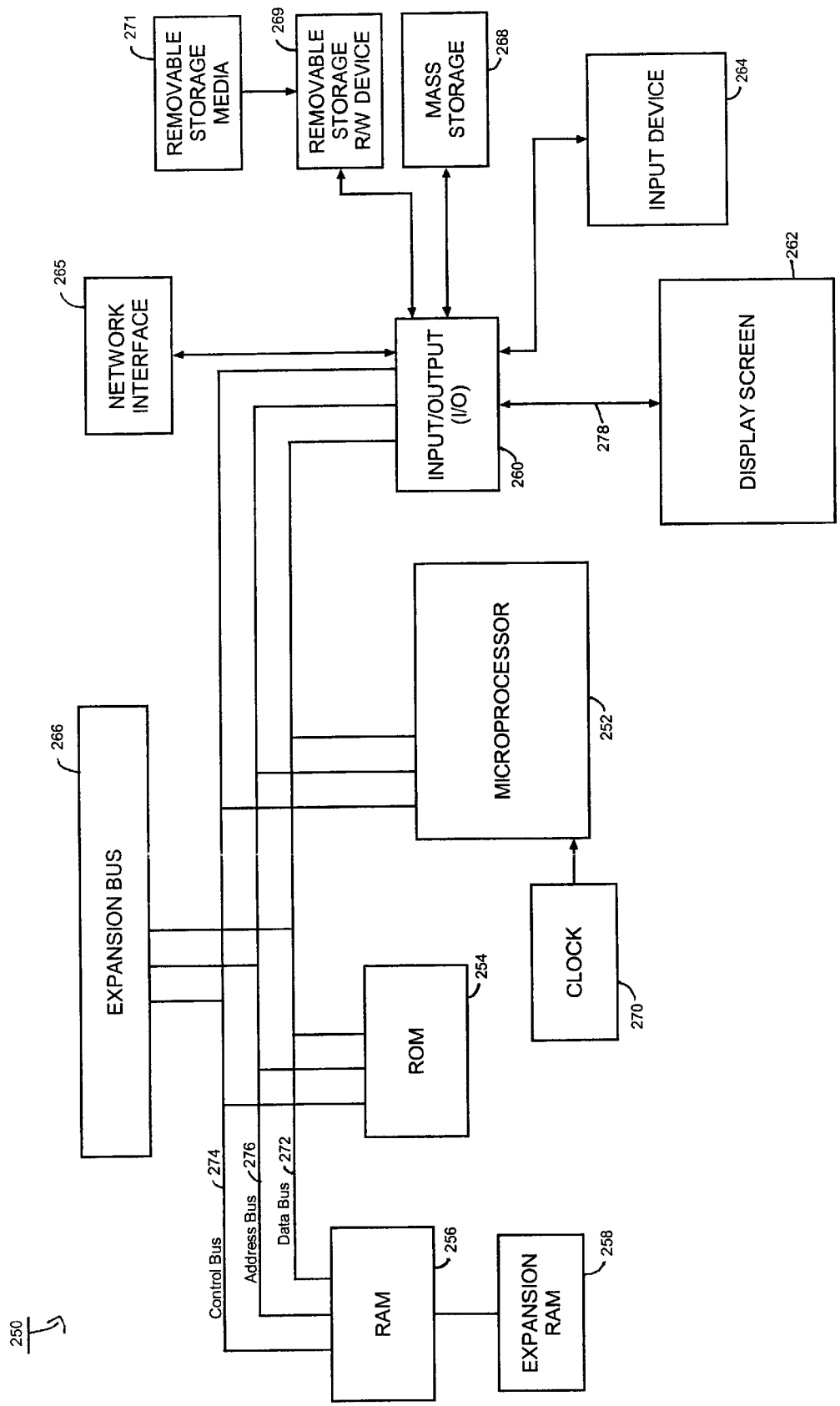
FIG. 3 is a simplified block diagram of an exemplary computer system for implementing the techniques of the present invention.

Generally, the methods described herein will be practiced with a general purpose computer, either with a single processor or multiple processors. FIG. 3 is a block diagram of a general purpose computer system, representing one of many suitable computer platforms for implementing the methods described above. FIG. 3 shows a general purpose computer system 250 in accordance with the present invention. As shown in FIG. 3, computer system 250 includes a central processing unit (CPU) 252, read-only memory (ROM) 254, random access memory (RAM) 256, expansion RAM 258, input/output (I/O) circuitry 260, display assembly 262, input device 264, network interface 265, and expansion bus 266. Computer system 250 may also optionally include a mass storage unit 268 such as a disk drive unit or nonvolatile memory such as flash memory and a real-time clock 270.

CPU 252 is coupled to ROM 254 by a data bus 272, control bus 274, and address bus 276. ROM 254 contains the basic operating system for the computer system 250. CPU 252 is also connected to RAM 256 by busses 272,274, and 276. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and a network via network interface 265 and such peripheral devices as display assembly 262, input device 264, and mass storage 268.

Display assembly 262 of computer system 250 is an output device coupled to I/O circuitry 260 by a data bus 278. Display assembly 262 receives data from I/O circuitry 260 via bus 278 and displays that data on a suitable screen.

The screen for display assembly 262 can be a device that uses a cathode-ray tube (CRT), liquid crystal display (LCD), or the like, of the types commercially available from a variety of manufacturers. Input device 264 can be a keyboard, a mouse, a stylus working in cooperation with a position-sensing display, or the like. The aforementioned input devices are available from a variety of vendors and are well known in the art.

Some type of mass storage 268 is generally considered desirable. However, mass storage 268 can be eliminated by providing a sufficient amount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like.

A removable storage read/write device 269 may be coupled to I/O circuitry 260 to read from and to write to a removable storage medium 271. Removable storage medium 271 may represent, for example, a magnetic disk, a magnetic tape, an opto-magnetic disk, an optical disk, or the like. Instructions for implementing the inventive method may be provided, in one embodiment, to a network via such a removable storage media.

In operation, information is input into the computer system 250 by typing on a keyboard, manipulating a mouse or trackball, or "writing" on a tablet or on position-sensing screen of display assembly 262. CPU 252 then processes the data under control of an operating system and an application program, such as a program to perform the steps of the inventive method described above, stored in ROM 254 and/or RAM 256. It is noted that such process steps may initially be stored in mass storage 268, downloaded into RAM 256 and then executed out of RAM 256. CPU 252 then typically produces data which is output to the display assembly 262 to produce appropriate images on its screen.

Expansion bus 266 is coupled to data bus 272, control bus 274, and address bus 276. Expansion bus 266 provides extra ports to couple devices such as network interface circuits, modems, display switches, microphones, speakers, etc. to CPU 252. Network communication is accomplished through the network interface circuit 265 and an appropriate network.

Suitable computers for use in implementing the present invention may be obtained from various vendors. Various computers, however, may be used depending upon the size and complexity of the tasks. Suitable computers include mainframe computers, multiprocessor computers, workstations or personal computers. In addition, although a general purpose computer system has been described above, a special-purpose computer may also be used.

It should be understood that the present invention also relates to machine readable media on which are stored program instructions for performing the methods of this invention. Such media include, by way of example, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Conclusion

Although the present invention has been described in reference to an embodiment for use on the Internet, it should be understood that those embodiments are exemplary only and that other embodiments for use on other networks can also be provided in accordance with the teachings set forth above. In particular, it should be understood that references above to the Internet should be understood to apply equally to other networks, such as other packet switched networks. Similarly, in the more general case, references to IP addresses above can be replaced with references to network addresses or network identifiers, and other similar generalizations can be made, as will be understood by those skilled in the art.

Thus, although the present invention has been described in detail with regard to the exemplary embodiments and drawings thereof, it should be apparent to those skilled in the art that various adaptations and modifications of the present embodiments may be accomplished without departing from the spirit and the scope of the invention. Accordingly, the invention is not limited to the precise embodiments shown in the drawings and described in detail above. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood those skilled in the art.

In the following claims, those elements which do not include the words "means for" are intended not to be interpreted under 35 U.S.C. § 112 ¶ 6.

What is claimed is:

1. A method for use by a first node on a network in determining the geographic location of a second node on the network, said method comprising:

receiving a data packet over the network from the second node, the data packet including a network identifier for the second node; and sending plural probe packets addressed to the network identifier for the second node, wherein the plural probe packets are sent without waiting for a response from any of said plural probe packets.

2. A method according to claim 1, further comprising steps of:

receiving responses to the plural probe packets, each response including a network identifier for a router; and comparing the network identifier for at least one of the routers to a database that includes a geographic location for each of plural network identifiers in order to identify a geographic location for said at least one of the routers.

3. A method according to claim 2, further comprising a step of assigning a geographic location for said second node based on the geographic location for said at least one of the routers.

4. A method according to claim 3, further comprising steps of:

obtaining information that is based on the geographic location for the second node; and transmitting said information from the first node to the second node.

5. A method according to claim 4, wherein the data packet is a first communication in requesting a web page from said first node, wherein the web page is transmitted to said second node in response to said communication, and wherein said information that is based on the geographic location for the second node is included in the web page.

6. A method according to claim 1, wherein the plural probe packets are designed to elicit responses from said first node and from only a subset of the routers on a route between said first node and said second node.

7. A method according to claim 6, said subset of routers includes only those routers closest to said second node.

8. A method according to claim 6, wherein the data packet includes an indication of a number of hops made by the data packet, and wherein the plural probe packets are designed based on said indication.

9. A method according to claim 8, wherein said indication is a Time-To-Live (TTL) field.

10. A method according to claim 9, wherein the plural probe packets have TTL fields, and wherein at least two of the plural probe packets have a same value in their TTL fields.

11. A method according to claim 6, further comprising steps of:

determining, based on the responses to the plural probe packets, whether a routing anomaly exists; and if it is determined that a routing anomaly exists, sending a second set of probe packets.

12. A method according to claim 11, wherein the second set of probe packets is designed to probe an entire route between said first node and said second node.

13. A method according to claim 11, wherein it is determined in said determining step that assymetric routing exists.

14. A method according to claim 1, wherein said data packet is a SYN packet requesting initiation of a TCP connection, and wherein said plural probe packets are sent without waiting for completion of a handshaking operation required to initiate the TCP connection.

15. An apparatus for use by a first node on a network in determining the geographic location of a second node on the network, said apparatus comprising:

receiving means for receiving a data packet over the network from the second node, the data packet including a network identifier for the second node; and sending means for sending plural probe packets addressed to the network identifier for the second node, wherein the plural probe packets are sent without waiting for a response from any of said plural probe packets.

16. An apparatus according to claim 15, further comprising:

means for receiving responses to the plural probe packets, each response including a network identifier for a router; and means for comparing the network identifier for at least one of the routers to a database that includes a geographic location for each of plural network identifiers in order to identify a geographic location for said at least one of the routers.

17. An apparatus according to claim 15, wherein the plural probe packets are designed to elicit responses from said first node and from only a subset of the routers on a route between said first node and said second node.

18. A computer-readable medium storing computer-executable process steps for use by a first node on a network in determining the geographic location of a second node on the network, said process steps comprising steps to:

receive a data packet over the network from the second node, the data packet including a network identifier for the second node; and send plural probe packets addressed to the network identifier for the second node, wherein the plural probe packets are sent without waiting for a response from any of said plural probe packets.

19. A computer-readable medium according to claim 18, wherein the plural probe packets are designed to elicit responses from said first node and from only a subset of the routers on a route between said first node and said second node.

20. A computer-readable medium according to claim 18, wherein said process steps further comprise steps to:

receive responses to the plural probe packets, each response including a network identifier for a router; and compare the network identifier for at least one of the routers to a database that includes a geographic location for each of plural network identifiers in order to identify a geographic location for said at least one of the routers.

* * * * *